United States Patent [19]

Schwingenschuh et al.

[11] Patent Number: 4,714,910
[45] Date of Patent: Dec. 22, 1987

[54] ELECTRICAL COMPONENT HAVING HIGH STRENGTH GIVEN STRESSING DUE TO TEMPERATURE CHANGE AND DUE TO SURGE CURRENTS, PARTICULARLY A VARISTOR

[75] Inventors: Martin Schwingenschuh, Graz/Osterreich; Franz Meschan, Stainz/Osterreich; Gert Ribitsch, Graz/Osterreich, all of Austria

[73] Assignee: Siemens Aktiengesellschaft, Berlin and Munich, Fed. Rep. of Germany

[21] Appl. No.: 22,003

[22] Filed: Mar. 5, 1987

[30] Foreign Application Priority Data

Apr. 23, 1986 [DE] Fed. Rep. of Germany ....... 3613787

[51] Int. Cl.$^4$ .............................................. H01C 7/10
[52] U.S. Cl. .................................... 338/21; 338/328; 338/329
[58] Field of Search ..................... 338/21, 22, 25, 322, 338/328, 329, 333, 334; 219/541

[56] References Cited

U.S. PATENT DOCUMENTS

| | | | |
|---|---|---|---|
| 3,793,604 | 2/1974 | Duggan et al. | 338/329 |
| 3,959,763 | 5/1976 | Sibley et al. | 338/21 |
| 4,212,045 | 7/1980 | Martzlaff | 338/21 X |
| 4,635,026 | 1/1987 | Takeuchi | 338/22 R X |
| 4,644,316 | 2/1987 | Takeuchi et al. | 338/22 R |

*Primary Examiner*—C. L. Albritton
*Attorney, Agent, or Firm*—Hill, Van Santen, Steadman & Simpson

[57] ABSTRACT

An electrical component, particularly a varistor, having high strength given stressing due to temperature change and due to surge currents is composed of a ceramic body whose end faces contain solderable metallic coatings as electrodes to which power supply elements are soldered, the latter being composed of a closed strip which leaves open and inwardly-disposed area and an outwardly-disposed area on the coating and which is dimensioned such that the condition Fa:FI=Ua:Ui=1.05 through 1.35 is met, where Fa is the surface of the coating located outside of the power supply element, Fi is the surface of the coating lying inside the power supply element, Ua is the outer circumference of the power supply element and Ui is the inner circumference of the power supply element. Each power supply element contains a lead clip which is spaced from the metallic surface by bends to such a degree that the clip is not soldered to the metallic coating.

8 Claims, 2 Drawing Figures

ELECTRICAL COMPONENT HAVING HIGH STRENGTH GIVEN STRESSING DUE TO TEMPERATURE CHANGE AND DUE TO SURGE CURRENTS, PARTICULARLY A VARISTOR

BACKGROUND OF THE INVENTION

1. Field of the Invention

The present invention is directed to an electrical component having high strength given stressing due to temperature change and due to surge currents, the component being composed of a ceramic sintered body having a circular, rectangular or square cross section, particularly a voltage-dependent electrical resistor (varistor) of zinc oxide material which is semiconducting due to doping and whose end faces contain solderable layers as electrodes which do not extend up to the circumferential surface thereof and to which annular current leads are centrally soldered.

2. Description of the Prior Art

An electrical component, in particular an electrical resistor having a negative temperature coefficient of resistance (NTC resistor) and comprising the aforementioned features where, however, particularly small dimensions should be present, namely a diameter of 1.5 mm–5 mm and a thickness in the range of 0.6 mm–2.5 mm is disclosed in the German Gebrauchsmuster No. 85 06 668 of Apr. 10, 1986, published May 22, 1986, and which largely corresponds to the European patent application No. 86102471.9. Given this NTC resistor, the current leads are annularly constructed at one end as a largely closed eyelet whose outside diameter amounts to, at most 60% of the diameter of the layers of the wafer and the annular eyelet of each current lead is centrally soldered to the layers, whereby the solder surrounds the eyelet, to the extent that the solder is limited to the region of the eyelet and the edge regions of the layers are not covered with solder.

For NTC resistors having particularly small dimensions, this embodiment achieves the object of guaranteeing a terminal resistance having a drift of less than 1% for the current leads soldered to the solderable metallic layers given a temperature shock stress of 100-fold change between $-60°$ C. and $360°$ C., preferably $-36°$ C. through $+130°$ C. and of thereby producing a stable mount of the ceramic wafer by the current leads carrying the wafer.

The prior art, particularly the German published application No. 19 47 799 and U.S. Pat. Nos. 2,606,995 and 2,686,244, fully incorporated herein by this reference, and treated in detail in the German Gebrauchsmuster No. 85 06 668, is not suitable for achieving this object, as set forth in detail therein.

In electrical components having a ceramically-manufactured body, for example of ceramic material having a positive temperature coefficient (PTC resistors) or having a negative temperature coefficient (NTC resistors) but also in electrical capacitors having a ceramic body of dielectrically-effective material and, in particular, in voltage-dependent electrical resistors (varistors or, respectively, VDR resistors), however, the problem of adequate resistance to thermal cycling, whereby a multitude of brief temperature changes between high temperatures, for example $360°$ C. and above, and low temperatures, for example $-40°$ C. and below, for example down to $-55°$ C., whereby the different coefficients of expansion of the current leads, on the one hand, and of the ceramic body, on the other hand, cause mechanical stresses which, when the maximum rupturing stress is exceeded, lead to cracks in the ceramic body or even to the destruction thereof is not the only problem, rather the electrical components under discussion here must also have high resistance to surge current loads.

For example, given combination elements composed of one or more PTC resistors (deposit stores) and at least one varistor, surge current loads up to about 2,000 A can occur. Given NTC resistors for limiting inrush current (surge protection NTC), surge stresses having currents of a number of 100 A occur. Similar values can also occur given ceramic capacitors.

Varistors are subject to particularly high surge current loads, these having to be able to resist surge current stresses having currents of $10^3$–$10^5$ A.

The electrical components under discussion here, particularly the varistors, are thin wafers having a thickness of 0.7 mm–2 mm, thick wafers having a thickness from 10 mm–30 mm and wafers having a thickness lying therebetween. The diameter, particularly of varistors, lies in the order of magnitude of from 30 mm–80 mm.

At their opposite end faces, the ceramic bodies of these components comprise electrodes, usually composed of screen printed silver paste which are applied to the ceramic body in a known manner after it is manufactured and which are heated later at temperatures of between $600°$ C. and $800°$ C.

For resolving the problem of resistance to thermal cycling, it would be most beneficial to solder the power leads to these layers in a punctiform manner because mechanical stresses occurring in the temperature cycle would then not have any influence on the ceramic body.

The execution of power leads soldered in punctiform fashion, however, is practically unrealizable for the resistance to surge current. It would be necessary to solder large-area electrodes having good conductivity to the layers in order to achieve a uniform current distribution. When a minimum radius of the power lead is exceeded, the current density at the edge thereof rises above the maximum current density and melting or, respectively, evaporation of the metal of the layer of the component occurs at this location. The maximum current density therefore also depends on the current-carrying capability of the metallized layer. Copper or brass, which are themselves solderable and which can be soldered to the metallic layers of the electrical component, are usually employed as metals for the power supply elements.

Up to a diameter of about 25 mm for the metallic coatings on the end faces of the electrical component, particularly of the varistor, the mechanical stressing still remains below the rupturing stress of the ceramic body given cooling to $-40°$ C. Given larger diameters or greater areas of the metallic layers, the ceramic begins to tear. This especially occurs given thin ceramic layers (for example 0.7 mm–2 mm). The only varistor of this size currently commercially available has a diameter of 60 mm, but the thickness of these wafers is 5 mm. These wafers are contacted by soldering power supply elements to the metal layers. Given thin wafers, particularly given varistors, an adequate resistance to thermal cycling is no longer guaranteed.

SUMMARY OF THE INVENTION

The object of the present invention is to provide an electrical component of the type initially set forth, particularly a varistor, which is provided with power supply elements that guarantee a high resistance to thermal cycling as well as to stresses due to surge currents. Given a circular cross section, the components under discussion here should have a diameter of at least 30 mm; given a square or rectangular cross section they should comprise a minimum width of 30 mm; both thin (0.7 mm–2 mm) and medium, as well as thick (10 mm–30 mm) ceramic bodies should be contacted in the specified manner.

The above object is achieved, according to the present invention, in an electrical component of the type initially set forth which is particularly characterized in that each power lead is composed of a closed strip which leaves an outwardly-residing surface and an inwardly-residing surface free on the metal layer, which is composed of solderable metal, which comprises a thickness of 0.2 mm–1 mm and whose width is dimensioned such that the condition $Fa:Fi=Ua:Ui=1.05$ through 1.35 is met, where Fa denotes the surface of the coating located outside of the power supply element, Fi denotes the surface of the coating lying inside the power supply element, Ua denotes the outer circumference of the power supply element and Ui denotes the inner circumference of the power supply element; and in that every power supply element is provided with a lead clip which, forming a clearance from the surface of the coating due to bands at the outer circumference of the power supply element, is lifted off to such a degree that it is not soldered to the metal coating.

Elements constructed in accordance with the present invention offer the following advantages.

Due to the slight width resulting from the specified relationship and due to the specified, small thickness of the power supply elements, the tensile stress given thermal cycling is reduced to such a degree that cracks and destruction do not occur at the ceramic body.

The ohmic voltage drop at the power supply elements is less than 1% of the voltage dropping off at the varistor. It was measured with the nominal surge current of 80/20 μs according to the 1973 standard IEC 60-2.

Due to the specified ratio between the outer surface Fa and the inner surface Fi or, respectively, between the outer circumference Ua and the inner circumference Ui, not only is a low mechanical stressing given thermal cycling achieved, but an adequate distribution of the electrical voltage is also managed because identical densities of the current lines occur at the outer edge and at the inner edge of the power supply element.

In that the lead clip is lifted off from the surface of the metal coating to such a degree that a clearance is formed between the clip and is therefore not soldered to the coating, it is guaranteed that the conditions established by the power supply are not disturbed.

The soldering of the power supply elements to the metallic coatings of the ceramic bodies can occur on the basis of the known flow soldering method, but also by way of immersion soldering under given conditions because the special dimensioning of the power supply elements makes it unnecessary to limit the extent of the solder to only the region of the power supply elements. To the contrary, what is achieved, given a soldering process wherein not only the power supply elements are soldered to the metallic coatings but the entire surface of the metallic coatings is also coated with a solder in a thin layer, is that an even more beneficial current distribution is present given surge current stressing.

Preferred embodiments of the invention are constructed such that the ratio $Fa:Fi=Ua:Ui=1.1$ through 1.2 is provided; in that the power supply elements are annularly constructed given a circular body; in that the power supply elements are fashioned as a rectangular or square frame given a body having a rectangular or square cross section; in that the power supply elements are composed of a nonsolderable metal and are provided with a solderable coating; in that the power supply elements punched from a corresponding sheet metal of one piece together with the power supply clips or terminals.

EXAMPLE

Given a 60 mm diameter of a circular wafer of a varistor, given a thickness of 1.2 mm, a radius of the metallic coating $R_a$ of 28.62 mm the metal-free edge between the outer circumference of the metallic coating and the circumferential surface of the wafer is 1.38 mm wide. An annular power supply element whose outer radius $r_a$ amounts to 21 mm, whose inner radius $r_i$ amounts to 18 mm and whose thickness amounts to 0.5 mm is provided for such component.

Given these dimensions, the ratio between the outer circumference Ua and the inner circumference Ui or, respectively, between the outer electrode surface Fa and the inner electrode surface Fi of 1.167 is preserved and therefore lies between the specified limit values.

BRIEF DESCRIPTION OF THE DRAWINGS

Other objects, features and advantages of the invention, its organization, construction and operation will be best understood from the following detailed description, taken in conjunction with the accompanying drawing, on which.

Identical reference characters are employed for identical parts in both figures.

DESCRIPTION OF THE PREFERRED EMBODIMENTS

Figure 1:
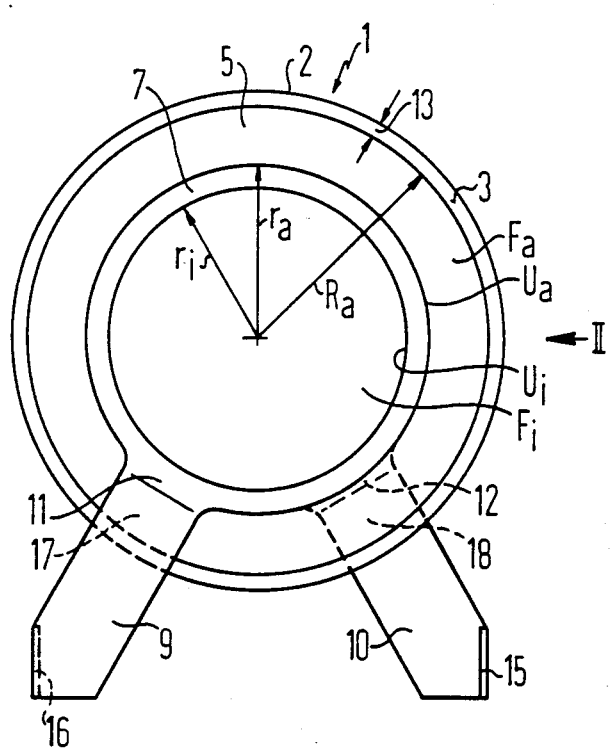
FIG. 1 is a plan view of a wafer-shaped component constructed in accordance with the present invention.
Figure 2:
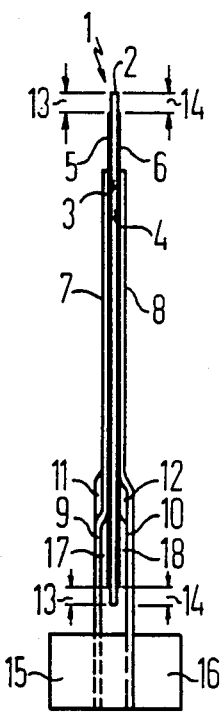
FIG. 2 is a side view of the component of FIG. 1 as viewed in the direction of the arrow II in FIG. 1.

Referring to the drawing, a wafer-shaped ceramic body 1 has two end faces 3 and 4 which are provided with respective metal coatings 5 and 6 of, for example, screen printed silver paste which do not extend up to the circumferential surface 2 of the body 1 and which leave free areas 13 and 14 between their edges and the circumferential surface 2.

Annular power supply elements 7 and 8 are centrally soldered to the two coatings 5 and 6, i.e. the center of the wafer-shaped ceramic body 1 and the center of the annular power supply elements coincide.

The radius $R_a$ of the metallic, solderable coatings 5 and 6 is dimensioned such that an area Fa of the coatings 5 and 6 results outside of the power supply elements 7 and 8.

The difference between the outer radius $r_a$ and the inner radius $r_i$ of the power supply element 7 or, respectively, 8 defines, first, the width of the annular power supply element and, second, the ratio between the outer circumference Ua and the inner circumference Ui thereof.

The area Fa of the metallic coating 5 or, respectively, 6 located outside of the power supply element or, respectively, 8 should, in accordance with the present invention, have the same ratio to the inner area Fi as the outer circumference Ua has to the inner circumference Ui of the power supply element 7 or, respectively, 8.

The power supply elements 7 or, respectively 8 are provided with respective clips or terminals 9, 10 which are lifted or spaced from the surface of the coatings 5 and 6 by bends 11 and 12, respectively, at the outer circumference Ua of the power supply elements 7 and 8 to such a degree that they form clearances 17 and 18, respectively, whereby these clearances are not connected with solder.

Solder lugs 15 or, respectively, 16 are provided at the lead clips 9 and 10, the solder lugs serving the purpose of connecting the lead clips to the terminals of the device that is to be provided with a varistor, as in the present case, or with a PTC resistor, an NTC resistor or a ceramic capacitor.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:
1. An electrical component comprising:
   a sintered ceramic body including a pair of opposed surfaces and a peripheral edge;
   a pair of solderable metal coatings, each carried on a respective surface of said body; and
   a pair of power supply elements each soldered to a respective metal coating and each including a flat loop comprising an outer edge and an inner edge, and
   a lead clip extending from said outer edge and spaced from the respective metal coating,
   each of said power supply elements including a thickness in the range of 0.2 through 1 mm and dimensioned in accordance with the relationships $Fa/Fi = Ua/Ui = 1.05$ through $1.35$,
   where Fa is the area between the outer edge of a power supply element and the peripheral edge of said body, Fi is the area enclosed within an inner edge of a power supply element, Ua is the peripheral dimension of a power supply element and Ui is the inner peripheral dimension of a power supply element.
2. The electrical component of claim 1, wherein: $Fa/Fi = Ua/Ui = 1.1$ through $1.2$.
3. The electrical component of claim 1, wherein: said ceramic body and said loops are annular.
4. The electrical component of claim 1, wherein: said ceramic body and said loops are square.
5. The electrical component of claim 1, wherein: said ceramic body and said loops are rectangular.
6. The electrical component of claim 1, wherein: said power supply elements each comprise solderable material.
7. The electrical component of claim 1, wherein: said power supply elements each comprise a solderable material carried on a nonsolderable material.
8. The electrical component of claim 1, wherein: each of said loops and the respective lead clip are a one-piece component punched from sheet metal.

* * * * *